United States Patent
Liang et al.

(10) Patent No.: US 12,240,126 B2
(45) Date of Patent: Mar. 4, 2025

(54) COLLABORATIVE-MANIPULATION ROBOTIC ARM FOR KITCHEN WASTE AND WORKING METHOD THEREOF

(71) Applicant: HUNAN UNIVERSITY, Changsha (CN)

(72) Inventors: Qiaokang Liang, Changsha (CN); Hai Qin, Changsha (CN); Songyun Deng, Changsha (CN); Zhanjin Deng, Changsha (CN); Li Zhou, Changsha (CN); Yaonan Wang, Changsha (CN); Wei Sun, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/755,832

(22) Filed: Jun. 27, 2024

(65) Prior Publication Data
US 2024/0351213 A1 Oct. 24, 2024

Related U.S. Application Data

(63) Continuation of application No. PCT/CN2024/073818, filed on Jan. 24, 2024.

(30) Foreign Application Priority Data

Apr. 19, 2023 (CN) .......................... 202310419581.1

(51) Int. Cl.
*B25J 9/16* (2006.01)
*B25J 9/10* (2006.01)
(Continued)

(52) U.S. Cl.
CPC ............. *B25J 9/1679* (2013.01); *B25J 9/102* (2013.01); *B25J 9/1653* (2013.01); *B25J 9/1697* (2013.01); *B25J 11/0045* (2013.01); *B25J 13/084* (2013.01)

(58) Field of Classification Search
CPC ........ B25J 9/1679; B25J 9/102; B25J 9/1653; B25J 9/1697; B25J 11/0045; B25J 13/084
See application file for complete search history.

(56) References Cited

U.S. PATENT DOCUMENTS

| | | | |
|---|---|---|---|
| 5,100,005 A | * | 3/1992 | Noble .................... B65F 1/0006 209/699 |
| 12,090,641 B2 | * | 9/2024 | Shi ......................... B25J 9/1679 |

(Continued)

FOREIGN PATENT DOCUMENTS

| | | |
|---|---|---|
| CN | 207312007 U | 5/2018 |
| CN | 110733810 A | 1/2020 |

(Continued)

*Primary Examiner* — Jason Holloway
*Assistant Examiner* — Madison B Emmett
(74) *Attorney, Agent, or Firm* — Bayramoglu Law Offices LLC (57) ABSTRACT

A collaborative-manipulation robotic arm for kitchen waste and a working method thereof are provided. The robotic arm includes: a base, including a transverse first mounting seat and a second mounting seat connected to the first mounting seat and extending downward; a driving mechanism, disposed at an end of the first mounting seat away from the second mounting seat; a front guide claw, an upper end of the front guide claw being connected to the driving mechanism; a fixed blade, disposed on a side of the second mounting seat facing the front guide claw; and a retractable finger, disposed at a lower end on the side of the second mounting seat facing the front guide claw. The fixed blade, the retractable finger, and the second mounting seat form a rear cutting claw.

6 Claims, 5 Drawing Sheets

(51) Int. Cl.
    *B25J 11/00*     (2006.01)
    *B25J 13/08*     (2006.01)

(56) References Cited

U.S. PATENT DOCUMENTS

| | | | |
|---|---|---|---|
| 2010/0234856 A1* | 9/2010 | Stoianovici | A61B 34/70 606/130 |
| 2012/0168354 A1* | 7/2012 | Sundholm | B65F 1/1484 209/10 |
| 2017/0095264 A1* | 4/2017 | Schmitz | A61B 18/1206 |
| 2018/0035606 A1* | 2/2018 | Burdoucci | A01D 34/008 |
| 2018/0289385 A1* | 10/2018 | Schmitz | A61B 17/32002 |
| 2019/0031385 A1* | 1/2019 | Boira Bonhora | B65B 69/0008 |
| 2019/0381667 A1* | 12/2019 | Lee | B25J 9/162 |
| 2019/0382200 A1* | 12/2019 | Lee | G01F 23/284 |
| 2020/0281122 A1* | 9/2020 | Mor | A01F 15/00 |
| 2021/0237262 A1 | 8/2021 | Holopainen et al. | |
| 2021/0374894 A1* | 12/2021 | Wisdom | G06V 20/56 |
| 2022/0219857 A1* | 7/2022 | Tsujimori | B25J 15/009 |
| 2023/0068237 A1* | 3/2023 | Knopf | B25J 15/10 |
| 2023/0399136 A1* | 12/2023 | Budu | B25J 9/0084 |
| 2024/0217119 A1* | 7/2024 | Shi | B25J 15/0071 |
| 2024/0262011 A1* | 8/2024 | Ewers | B09B 3/35 |

FOREIGN PATENT DOCUMENTS

| | | |
|---|---|---|
| CN | 111144480 A | 5/2020 |
| CN | 112077130 A | 12/2020 |
| CN | 112550986 A | 3/2021 |
| CN | 214085183 U | 8/2021 |
| CN | 216098932 U | 3/2022 |
| CN | 115848853 A | 3/2023 |
| CN | 115946938 A | 4/2023 |
| CN | 116550649 A | 8/2023 |
| JP | H0910619 A | 1/1997 |
| JP | 2003126823 A | 5/2003 |
| KR | 20230000013 A | 1/2023 |

\* cited by examiner

COLLABORATIVE-MANIPULATION ROBOTIC ARM FOR KITCHEN WASTE AND WORKING METHOD THEREOF

CROSS REFERENCE TO THE RELATED APPLICATIONS

This application is a continuation application of International Application No. PCT/CN2024/073818, field on Jan. 24, 2024, which is based upon and claims priority to Chinese Patent Application No. 202310419581.1, filed on Apr. 19, 2023, the entire contents of which are incorporated herein by reference.

TECHNICAL FIELD

The present invention relates to the field of waste sorting technologies, and in particular, to a collaborative-manipulation robotic arm for kitchen waste and a working method thereof.

BACKGROUND

Municipal waste has complex constituents and greatly varied forms and physical and chemical features. Therefore, the resource utilization and biosafety disposal of waste are urgently required, and are urgent requirements for promoting the ecological civilization construction and achieving the "carbon neutrality" objective. In an existing automated waste sorting system, a large amount of waste is usually disposed in an assembly line form. Dry waste, wet waste, frozen waste, and the like are transferred to a feed bin of the automated waste sorting system in large bags. After bag breaking, bagged waste is placed on a waste disposal assembly line. For the waste on the assembly line, iron metal is first separated through a magnetic separation, pneumatic separation, or another conventional sorting method, then recyclable waste such as plastic bottles and inert constituents such as wood, bamboo, and fiber are sorted by a sorting robotic arm, and finally the resource utilization and biosafety disposal of waste are eventually achieved through resource utilization and other procedures.

SUMMARY

Technical Problem

There are still technical problems in existing implementation solutions. For example, the automation level of equipment is not high, the sorting reliability of robotic arms is inadequate, and the intelligence level is insufficient. For example, existing bag breaking apparatuses are mostly passive apparatuses such as fixed blades, and it is difficult to implement effective bag breaking of frozen waste bags or the like. In most existing robotic arms, a suction cup, a two-finger pneumatic clamping claw, or another mechanism is used, and it is very difficult to implement reliable grabbing. For example, when a plastic bottle is buried in waste and is only partially exposed, it is difficult to securely clamp the plastic bottle. When the surface of a plastic bottle is stained with oil waste or other kitchen waste and as a result it is difficult to attach the plastic bottle, sorting fails eventually.

In addition, because wood and bamboo (for example, barbeque bamboo sticks, disposable chopsticks, and the like) waste has an elongated shape and fiber (for example, napkins, dish rags, and the like) waste has soft texture, existing robotic arms using a suction cup or a two-finger pneumatic clamping claw cannot implement the sorting of waste of inert constituent types such as wood, bamboo, and fiber types.

Finally, existing waste sorting robotic arms are not equipped rich sensing measures and have low intelligence level. During sorting, such robotic arms cannot effectively monitor various state information and perform intelligent decision-making and sorting in a grabbing process.

Technical Solution

In view of the deficiencies in the existing technologies above, the present invention provides a collaborative-manipulation robotic arm for kitchen waste and a working method thereof, to solve the problems that existing robotic arms have low sorting reliability and an inadequate waste sorting effect.

To achieve the above objectives, the present invention adopts the technical solution as follows:

According to a first aspect, a collaborative-manipulation robotic arm for kitchen waste is provided, including:
 a base, including a transverse first mounting seat and a second mounting seat connected to the first mounting seat and extending downward;
 a driving mechanism, disposed at an end of the first mounting seat away from the second mounting seat;
 a front guide claw, an upper end of the front guide claw being connected to the driving mechanism;
 a fixed blade, disposed on a side of the second mounting seat facing the front guide claw; and
 a retractable finger, disposed at a lower end on the side of the second mounting seat facing the front guide claw.

For the collaborative-manipulation robotic arm for kitchen waste provided above, the fixed blade, the retractable finger, and the second mounting seat form a rear cutting claw, and the bag breaking of bagged waste objects can be completed through the cooperation of the front guide claw and the fixed blade of the rear cutting claw. The grabbing and sorting of elongated waste objects can be completed through the cooperation of the front guide claw and the fixed blade of the rear cutting claw. The spearing and sorting of unburied or half-buried plastic waste objects, fiber waste, and the like can be completed through the cooperation of the front guide claw and the retractable finger of the rear cutting claw.

According to the first aspect, in a possible implementation, the robotic arm further includes: a vision module, disposed at a bottom of the first mounting seat. The vision module is configured to acquire a vision image after the robotic arm finishes performing a bag breaking or sorting action, making it convenient to determine, according to the vision image, whether bag breaking or sorting succeeds.

According to the first aspect, in a possible implementation, the robotic arm further includes: at least two haptic sensors, respectively disposed on the fixed blade and the retractable finger. The haptic sensors are disposed, and are configured to acquire haptic information on the fixed blade or the retractable finger after the robotic arm finishes performing a bag breaking or sorting action, to determine, by determining whether a force exceeds a threshold, whether bag breaking or sorting succeeds.

According to the first aspect, in a possible implementation, the front guide claw includes two symmetrically disposed curved claws; and each curved claw includes a roller rod curved toward the second mounting seat, a roller mounting seat disposed at a lower end of the roller rod, and a roller assembly mounted on the roller mounting seat.

According to the first aspect, in a possible implementation, the roller assembly includes a first reduction motor mounted on the roller mounting seat, a roller shaft connected to an output shaft of the first reduction motor, and a roller mounted on the roller shaft.

According to the first aspect, in a possible implementation, the driving mechanism includes a steering gear and a gear shaft transmission-connected to the steering gear; and upper ends of the two curved claws are respectively connected to two ends of the gear shaft.

According to the first aspect, in a possible implementation, the retractable finger includes a movable blade, a second reduction motor, a transmission disk, and a connecting rod; and an output shaft of the second reduction motor is connected to a center of the transmission disk, one end of the connecting rod is connected to an eccentric center of the transmission disk, the other end of the connecting rod is connected to a tail end of the movable blade, and the movable blade passes through a movable blade limiting hole provided in the second mounting seat.

According to a second aspect, a working method of the foregoing collaborative-manipulation robotic arm for kitchen waste is provided, including:
obtaining an execution mode of the robotic arm; and
performing, by the robotic arm, actions according to the execution mode:
if the execution mode is a bag breaking mode, performing the following actions: controlling the robotic arm to move to a target position point, synchronously controlling the driving mechanism to drive the front guide claw to rotate to a designated position, and then controlling the front guide claw to push a target object to the fixed blade to enable the fixed blade to pierce the target object;
if the execution mode is a sorting mode, performing the following actions: controlling the robotic arm to move to a target position point, synchronously controlling the driving mechanism to drive the front guide claw to rotate to a designated position, and then controlling the front guide claw to rotate toward the fixed blade and close to grab a target object; or
if the execution mode is a spearing mode, performing the following actions: controlling the robotic arm to move to a target position point, synchronously controlling the driving mechanism to drive the front guide claw to rotate to a designated position, then controlling the front guide claw to rotate toward the retractable finger and close to hold a target object, and subsequently controlling the retractable finger to extend to spear the target object.

According to the second aspect, in a possible implementation, the method further includes:
after the robotic arm finishes performing the actions according to the execution mode, using vision information acquired by the vision module disposed at the bottom of the first mounting seat and/or haptic information acquired by the haptic sensors disposed on the fixed blade/retractable finger to assist in determining whether target actions (that is, whether bag breaking or sorting is completed, where the sorting includes grabbing and sorting in the sorting mode and spearing and sorting in the spearing mode) are completed, and if the target actions are not completed, resetting the robotic arm, obtaining an execution mode of the robotic arm again, and performing actions according to the execution mode.

According to the second aspect, in a possible implementation, before the obtaining an execution mode of the robotic arm, the method further includes:
obtaining a depth vision image of an inputted target object;
inputting a Red, Green, Blue (RGB) image in the depth vision image into a deep neural network-based image recognition and classification model, to obtain a rectangular shape and position frame and a target object class of the target object;
generating coordinate information of a target position point of the robotic arm according to depth information in the depth vision image and the rectangular shape and position frame of the target object; and
selecting the execution mode of the robotic arm according to the target object class.

Beneficial Effects

The present invention provides the collaborative-manipulation robotic arm for kitchen waste and the working method thereof. The fixed blade, the retractable finger, and the second mounting seat form a rear cutting claw. The driving mechanism drives the front guide claw to rotate, and the robotic arm has a plurality of execution modes. In the bag breaking mode, the bag breaking of bagged waste objects can be completed through the cooperation of the front guide claw and the fixed blade of the rear cutting claw. In the sorting mode, the grabbing and sorting of elongated waste objects can be completed through the cooperation of the front guide claw and the fixed blade of the rear cutting claw. In the spearing mode, the spearing and sorting of unburied or half-buried plastic waste objects, fiber waste, and the like can be completed through the cooperation of the front guide claw and the retractable finger of the rear cutting claw. Different execution modes are selected according to different kitchen waste classes, so that the reliability is high, and a sorting effect is improved. The applicability is strong, the problem that a current robotic arm has unvaried sorting manners is solved, and sorting is more efficient. The vision module and the haptic sensors are disposed and may acquire vision information and haptic information after the robotic arm finishes performing a bag breaking or sorting action, so that it is convenient to determine, according to the vision information and/or the haptic information, whether bag breaking or sorting succeeds, thereby further improving the reliability of waste sorting.

BRIEF DESCRIPTION OF THE DRAWINGS

To describe the technical solutions in the embodiments of the present invention or in existing technologies more clearly, the accompanying drawings required for describing the embodiments or existing technologies are briefly described below. Apparently, the accompanying drawings in the following description show only some embodiments of the present invention, and a person of ordinary skill in the art may still derive other drawings from these accompanying drawings without creative efforts.

In the figures: 11—first mounting seat, 12—second mounting seat, 21—steering gear, 22—first gear, 23—second gear, 24—gear shaft, 25—first bearing, 3—front guide claw, 31—roller rod, 32—roller mounting seat, 33—first reduction motor, 34—roller shaft, 35—roller, 36—second bearing, 4—fixed blade, 5—retractable finger, 51—second reduction motor, 52—transmission disk, 53—connecting rod, 54—movable blade, and 6—vision module.

DETAILED DESCRIPTION OF THE EMBODIMENTS

To make the objectives, technical solutions, and advantages of the present invention clearer, the following describes the technical solutions in the present invention in detail. Apparently, the described embodiments are merely some embodiments of the present invention rather than all of the embodiments. All other embodiments obtained by a person of ordinary skill in the art based on the implementations of the present invention without creative efforts shall fall within the protection scope of the present invention.

In the description of the present invention, it should be understood that directions or location relationships indicated by terms "upper", "lower", "front", "rear", "left", "right", "top", "bottom", "inner", "outer", "center", "longitudinal", "transverse", "vertical", and "horizontal" are directions or location relationships shown based on the accompanying drawings, are merely used for the convenience of describing the present invention and simplifying the description, but are not used to indicate or imply that a device or an element needs to have a particular direction or needs to be constructed and operated in a particular direction, and therefore, cannot be understood as a limitation to the present invention. When a component is referred to as "being fixedly disposed at" another component, the component may be directly on the another component, or an intermediate component may exist. When one component is considered as "being connected to" another component, the component may be directly connected to the another component, or an intermediate component may exist at the same time.

It is to be noted that, in the description of the present invention, terms "first" and "second" are only used for the purpose of description and cannot be understood as indicating or implying relative importance or sequence.

In most existing robotic arms, a suction cup, a two-finger pneumatic clamping claw, or another mechanism is used, and it is very difficult to implement reliable grabbing. For example, when a plastic bottle is buried in waste and is only partially exposed, it is difficult to securely clamp the plastic bottle. When the surface of a plastic bottle is stained with oil waste or other kitchen waste and as a result it is difficult to attach the plastic bottle, sorting fails eventually. In addition, because wood and bamboo (for example, barbeque bamboo sticks, disposable chopsticks, and the like) waste has an elongated shape and fiber (for example, napkins, dish rags, and the like) waste has soft texture, existing robotic arms using a suction cup or a two-finger pneumatic clamping claw cannot implement the sorting of waste of inert constituent types such as wood, bamboo, and fiber types. Finally, existing waste sorting robotic arms are not equipped rich sensing measures and have low intelligence level and low reliability. Based on this, the present invention provides a collaborative-manipulation robotic arm for kitchen waste and a working method thereof, so that a plurality of working modes are provided, and it can be implemented that different execution modes are selected according to different kitchen waste classes, the reliability is high, a sorting effect is improved, and the applicability is strong. In addition, the present invention may further integrate vision information and/or haptic information to determine whether bag breaking or sorting succeeds, so that the intelligence level is improved, thereby further improving the reliability of waste sorting. The following describes technical solutions of the present invention in detail with reference to some specific embodiments.

Embodiment 1

Figure 1:
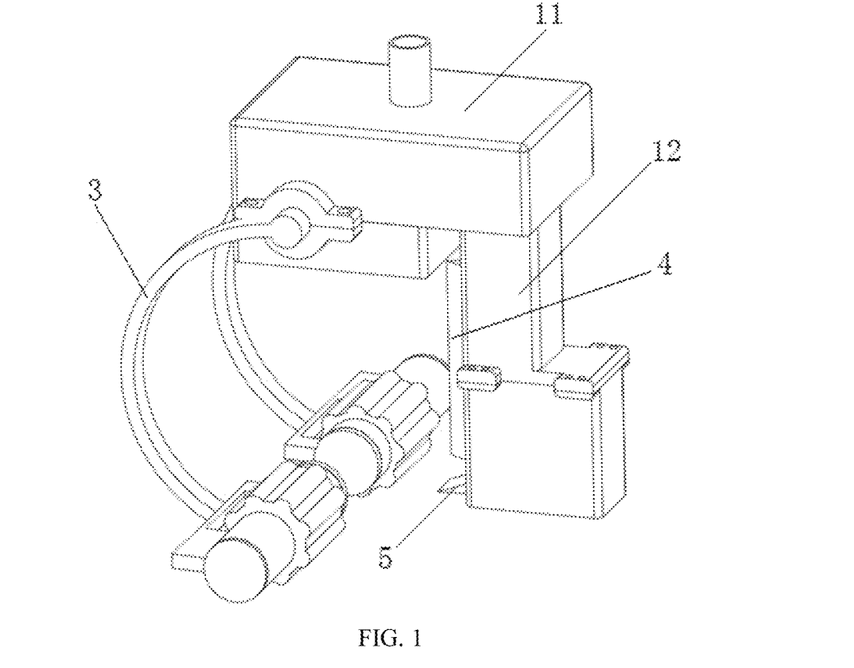
FIG. 1 is an overall schematic structural diagram of a collaborative-manipulation robotic arm for kitchen waste according to an embodiment of the present invention.
Figure 2:
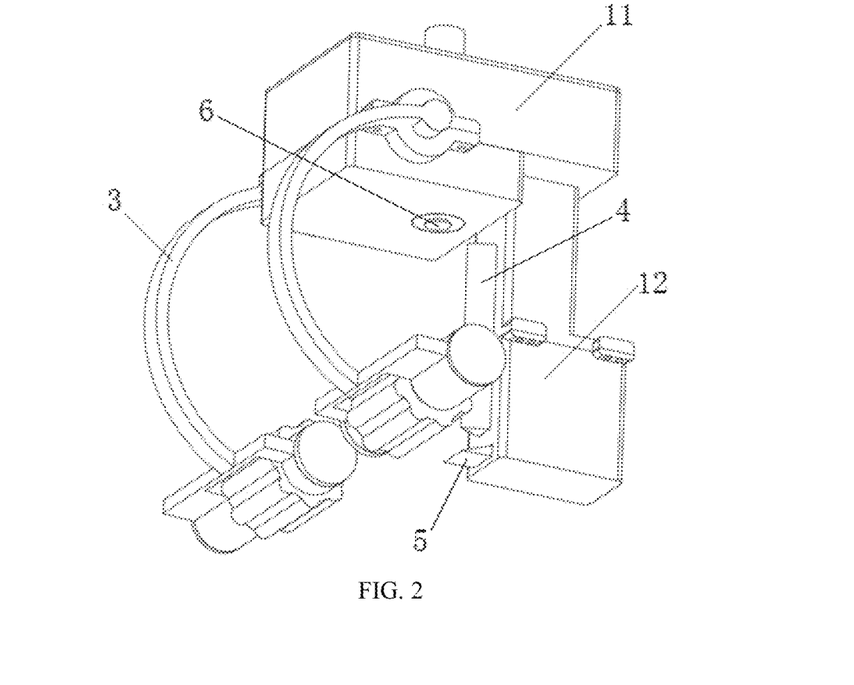
FIG. 2 is a schematic structural diagram of a collaborative-manipulation robotic arm for kitchen waste according to an embodiment of the present invention from another viewing angle.

As shown in FIG. 1 and FIG. 2, this embodiment provides a collaborative-manipulation robotic arm for kitchen waste, including:
 a base, including a transverse first mounting seat 11 and a second mounting seat 12 connected to the first mounting seat 11 and extending downward;
 a driving mechanism, disposed at an end of the first mounting seat 11 away from the second mounting seat 12;
 a front guide claw 3, an upper end of the front guide claw being connected to the driving mechanism;
 a fixed blade 4, disposed on a side of the second mounting seat 12 facing the front guide claw 3; and
 a retractable finger 5, disposed at a lower end on the side of the second mounting seat 12 facing the front guide claw 3.

In the collaborative-manipulation robotic arm for kitchen waste provided above, the driving mechanism is configured to drive the front guide claw 3 to rotate. The fixed blade 4, the retractable finger 5, and the second mounting seat 12 form a rear cutting claw. The robotic arm has a plurality of working modes. In a bag breaking mode, bagged waste objects may be pushed toward the fixed blade 4 through the cooperation of the front guide claw 3 and the fixed blade 4 of the rear cutting claw, and the bag breaking of the bagged waste objects can be completed. In a sorting mode, through the cooperation of the front guide claw 3 and the fixed blade 4 of the rear cutting claw, the front guide claw 3 rotates toward the fixed blade 4 and closes, and the grabbing of a target object is completed through the front guide claw 3 and the fixed blade 4, so that the grabbing and sorting of elongated waste objects can be completed. In a spearing mode, through the cooperation of the front guide claw 3 and the retractable finger 5 of the rear cutting claw, the front guide claw 3 rotates toward the retractable finger 5 and closes to hold a target object first, and then the retractable finger 5 extends to further hold the target object, so that the spearing and sorting of unburied or half-buried plastic waste objects, fiber waste, and the like can be completed. Different execution modes may be selected according to different kitchen waste classes, so that the reliability is high, a sorting effect is improved, and the applicability is strong.

Figure 3:
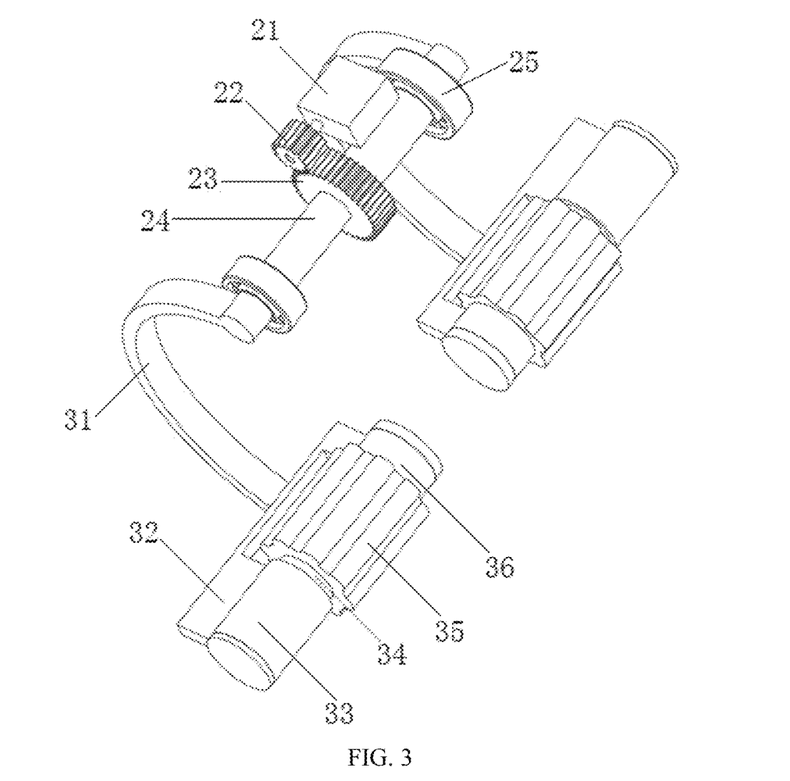
FIG. 3 is a schematic structural diagram of a driving mechanism and a front guide claw according to an embodiment of the present invention.

In some embodiments, as shown in FIG. 3, the front guide claw 3 includes two symmetrically disposed curved claws. Each curved claw includes a roller rod 31 curved toward the second mounting seat 12, a roller mounting seat 32 disposed at a lower end of the roller rod 31, and a roller assembly mounted on the roller mounting seat 32. The driving mechanism includes a steering gear 21 and a gear shaft 24 transmission-connected to the steering gear 21; and upper ends of the two curved claws are respectively connected to two ends of the gear shaft 24.

More specifically, the steering gear 21 outputs a torque. The steering gear 21 and a first gear 22 use a key clearance fit to transfer a torque. The first gear 22 is engaged with a second gear 23. The second gear 23 and the gear shaft 24 use a key clearance fit to transfer a torque. The two ends of the gear shaft 24 respectively pass through two first bearings 25 disposed on the first mounting seat 11 to use a key interference fit with the roller rod 31 to transfer a torque. The front guide claw 3 is controlled to unfold or close by controlling the forward and reverse rotation of the steering gear 21.

The roller assembly includes a first reduction motor 33 mounted on the roller mounting seat 32, a roller shaft 34 connected to an output shaft of the first reduction motor 33, and a roller 35 mounted on the roller shaft 34. The first reduction motor 33 and the roller shaft 34 use a key clearance fit to transfer a torque. The roller shaft 34 and the roller 35 use a key clearance fit to transfer a torque. An end of the roller shaft 34 away from the first reduction motor 33 is inserted into a second bearing 36 disposed on the roller mounting seat 32.

Figure 4:
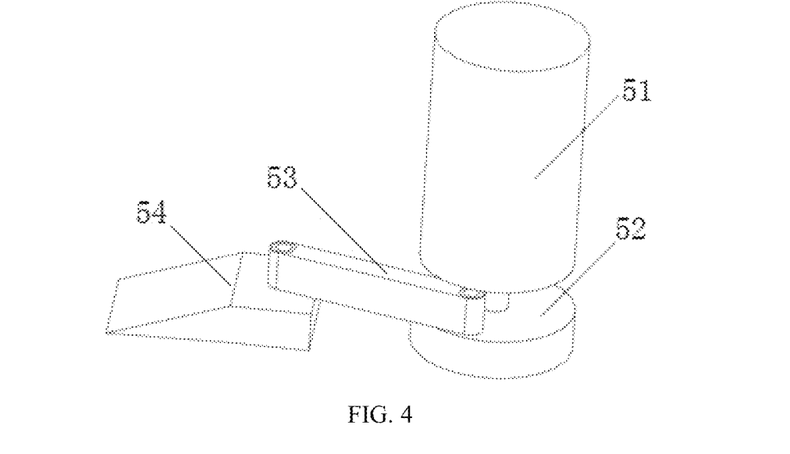
FIG. 4 is a schematic structural diagram of a retractable finger according to an embodiment of the present invention.
Figure 5:
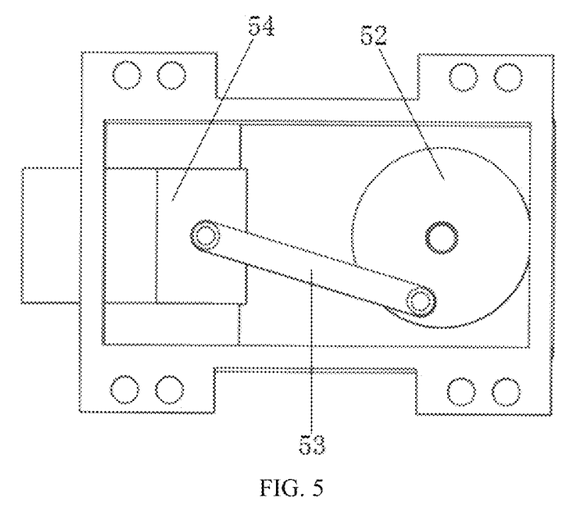
FIG. 5 is a top view of a retractable finger with a second reduction motor removed according to an embodiment of the present invention.

In some embodiments, as shown in FIG. 4 and FIG. 5, the retractable finger 5 includes a movable blade 54, a second reduction motor 51, a transmission disk 52, and a connecting rod 53; and an output shaft of the second reduction motor 51 is connected to a center of the transmission disk 52, one end of the connecting rod 53 is connected to an eccentric center of the transmission disk 52, the other end of the connecting rod 53 is connected to a tail end of the movable blade 54, and the movable blade 54 passes through a movable blade limiting hole provided in the second mounting seat 12. The second reduction motor 51 rotates to drive the transmission disk 52 to rotate, to drive the movable blade 54 through the connecting rod 53 to retractably slide along the movable blade limiting hole in the second mounting seat. During implementation, the extension and retraction of the movable blade 54 are implemented by controlling the forward and reverse rotation of the second reduction motor 51.

In this embodiment, the driving mechanism is disposed in the first mounting seat 11, and the second reduction motor 51, the transmission disk 52, and the connecting rod 53 are all disposed in the second mounting seat 12. A structure for increasing a frictional force is disposed on an outer surface of the roller 35. As shown in FIG. 3, a plurality of flanges axially disposed along the roller are disposed on the outer surface of the roller 35, and the plurality of flanges are evenly distributed in a circumferential direction of the outer surface of the roller. Certainly, another structure may be used in other embodiments. For example, a column of convex points axially disposed along the roller are used in place of each flange for improvement.

Embodiment 2

This embodiment provides a collaborative-manipulation robotic arm for kitchen waste. As shown in FIG. 2, a difference between this embodiment and Embodiment 1 lies in that the robotic arm further includes a vision module 6 disposed at a bottom of the first mounting seat 11. The vision module 6 is configured to acquire a vision image after the robotic arm finishes performing a bag breaking or sorting action, making it convenient for a robotic arm control system to determine, according to the vision image, whether bag breaking or sorting succeeds. If a bag is not broken or sorting fails, the robotic arm control system may control the robotic arm to perform a bag breaking or sorting action again, and the vision module is implemented by a camera.

Embodiment 3

This embodiment provides a collaborative-manipulation robotic arm for kitchen waste. A difference between this embodiment and Embodiment 1 lies in that the robotic arm further includes at least two haptic sensors (not shown in the figure), respectively disposed on the fixed blade 4 and the retractable finger 5.

During implementation, the haptic sensors are bonded to inclined surfaces of knife edges of the fixed blade 4 and the movable blade 54. The haptic sensor is disposed on the fixed blade 4, and is configured to acquire haptic information on the fixed blade 4 after the robotic arm finishes performing a bag breaking action or grabbing and sorting actions in the bag breaking mode or the sorting mode, that is, the magnitude of a force, to determine, by determining whether a force exceeds a threshold, whether bag breaking succeeds or grabbing and sorting succeed. If a bag is not broken or grabbing and sorting fail, the robotic arm control system may control the robotic arm to perform a bag breaking action or grabbing and sorting actions again. The haptic sensor is disposed on the movable blade 54, and is configured to acquire haptic information on the movable blade 54 after the robotic arm finishes performing spearing and sorting actions in the spearing mode, to determine, by determining whether a force exceeds a threshold, whether spearing and sorting succeed. If spearing and sorting fail, the robotic arm control system may control the robotic arm to perform spearing and sorting actions again.

Embodiment 4

This embodiment provides a collaborative-manipulation robotic arm for kitchen waste. A difference between this embodiment and Embodiment 1 lies in that the robotic arm further includes a vision module 6 disposed at a bottom of the first mounting seat 11 and at least two haptic sensors. The at least two haptic sensors are respectively disposed on the fixed blade 4 and the retractable finger 5. It is determined that the robotic arm succeeds in this round of bag breaking or sorting action only when it is determined, according to both a vision image acquired by the vision module and haptic information acquired by the haptic sensors, that bag breaking or sorting succeeds, or otherwise it is determined that the bag breaking or sorting action fails. The robotic arm control system may control the robotic arm to perform a bag breaking or sorting action again. For a specific manner of determination, refer to Embodiment 2 and Embodiment 3. Details are not described herein again.

Embodiment 5

Figure 6:
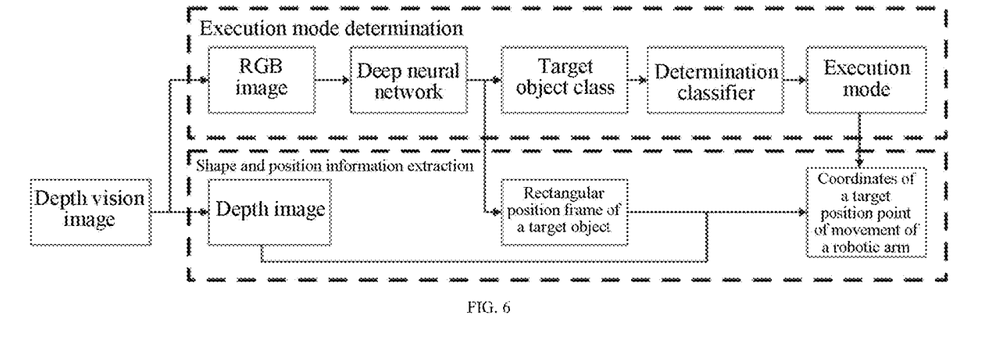
FIG. 6 is a flowchart of selecting an execution mode and obtaining a target position point according to an embodiment of the present invention.

Based on the collaborative-manipulation robotic arm for kitchen waste provided in the foregoing embodiments, this embodiment provides a working method of the collaborative-manipulation robotic arm for kitchen waste. Before the robotic arm works, first, an execution mode needs to be selected and a target position point needs to be obtained. Procedures of selecting an execution mode and obtaining a target position point are shown in FIG. 6, and include the following steps.

S11: Obtain a depth vision image of an inputted target object. In this embodiment, an example in which an RGB-D camera shoots the depth vision image of the target object is used for description. The depth vision image=a common RGB image+a depth image. The depth image includes an image channel of information related to a distance from an object surface in a viewing point scene. The channel is similar to a grayscale image, and every pixel value is an actual distance of an object measured by a sensor.

S12: Input an RGB image in the depth vision image into a deep neural network-based image recognition and classification model, to obtain a rectangular shape and position frame and a target object class of the target object. During implementation, a large number of vision images including various kitchen waste may be obtained, and position and class annotations are performed on target waste, to construct a large number of training samples, and then a deep convolutional neural network is trained to obtain the image recognition and classification model. After a vision image is inputted into the trained image recognition and classification model, the rectangular shape and position frame and the target object class of the target object may be outputted.

S13: Generate coordinate information of a target position point of the robotic arm according to depth information (the depth image in the depth vision image shot by the RGB-D camera in this embodiment) in the depth vision image and the rectangular shape and position frame of the target object.

S14: Select the execution mode of the robotic arm according to the target object class. The execution mode of the robotic arm is selected by a determination classifier. A mapping relationship between various kitchen waste and execution modes is prestored in the determination classifier, and the execution mode of the robotic arm may be directly obtained according to a mapping of the target object class.

Figure 7:
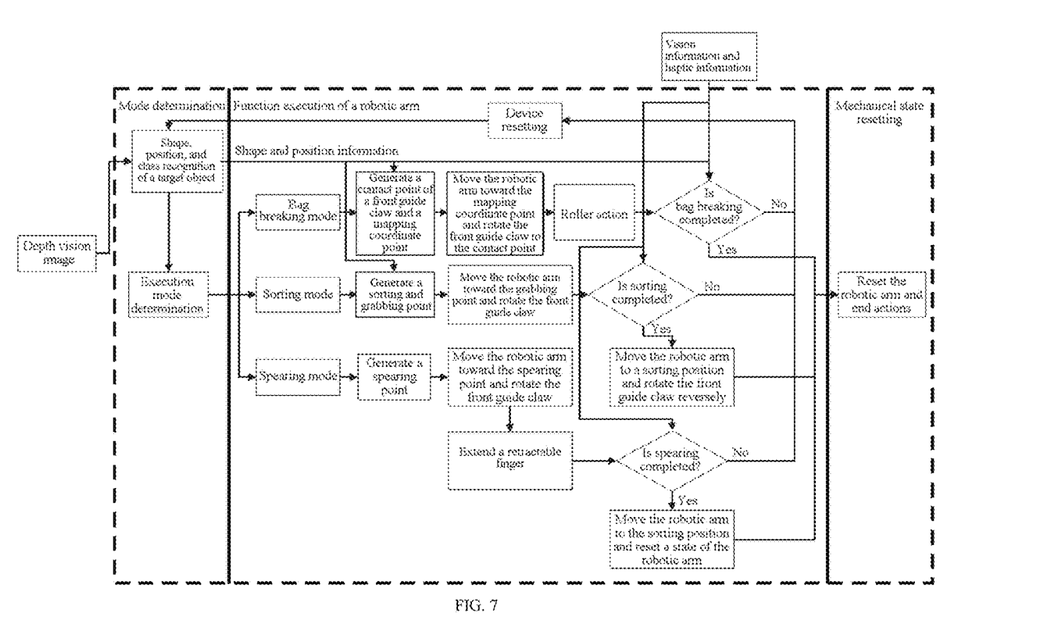
FIG. 7 is a working flowchart of a robotic arm according to an embodiment of the present invention.

The foregoing processes may all be completed by the robotic arm control system. After the foregoing processes are completed, the collaborative-manipulation robotic arm for kitchen waste may work. The working method includes:

S21: Obtain an execution mode of the robotic arm.

S22: The robotic arm performs actions according to the execution mode. Specifically, the following three cases are included:

(1) If the execution mode is a bag breaking mode, the following actions are performed: The robotic arm control system generates a contact point between the front guide claw and a target object (bagged waste objects) and a mapping coordinate point of a target position point of the movement of the robotic arm. The robotic arm control system controls the robotic arm to enable the robotic arm to move toward the target position point, synchronously controls the driving mechanism to drive the front guide claw to rotate to reach the contact point, and then controls a rolling action of the front guide claw to push the target object to the fixed blade to enable the fixed blade to pierce the target object. Then, the robotic arm control system assists in determining, according to vision information acquired by the vision module and/or haptic information acquired by the haptic sensors, whether bag breaking is completed. If yes, the robotic arm is reset, and this round of actions is ended. If not, the robotic arm is reset, an execution mode of the robotic arm is obtained again, and actions are performed according to the foregoing procedures. In this mode, the bag breaking of bagged waste objects can be completed.

(2) If the execution mode is a sorting mode, the following actions are performed: The robotic arm control system generates position coordinates of a sorting and grabbing point (a target position point), and the position of the sorting and grabbing point needs to ensure that a working range of the front guide claw can cover a target object. The robotic arm is controlled to move toward the position of the sorting and grabbing point, the driving mechanism is synchronously controlled to drive the front guide claw to rotate to a designated position, and then the front guide claw is controlled to rotate toward the fixed blade and close to grab the target object, and lock the roller. Then, the robotic arm control system assists in determining, according to vision information acquired by the vision module and/or haptic information acquired by the haptic sensors, whether grabbing and sorting are completed. If yes, the robotic arm moves toward a position of a sorting point, after the robotic arm reaches the position, the front guide claw is rotated reversely to release the target object, then the robotic arm is reset, and this round of actions is ended. If not, the robotic arm is reset, an execution mode of the robotic arm is obtained again, and actions are performed according to the foregoing procedures. In this mode, the grabbing and sorting of elongated waste objects can be completed.

(3) If the execution mode is a spearing mode, the following actions are performed: The robotic arm control system generates position coordinates of a spearing point (a target position point), and the position of the grabbing point needs to ensure that the retractable finger on the rear cutting claw can touch a target object. The robotic arm is controlled to move toward the position of the spearing point, the driving mechanism is synchronously controlled to drive the front guide claw to rotate to a designated position, then the front guide claw is controlled to rotate toward the retractable finger and close and lock the roller to hold the target object, and subsequently the retractable finger is controlled to extend to spear the target object, to assist in fixing the target object. Then, the robotic arm control system assists in determining, according to vision information acquired by the vision module and/or haptic information acquired by the haptic sensors, whether spearing is completed. If yes, the robotic arm moves toward a position of a sorting point, after the robotic arm reaches the position, the states of the front guide claw and the retractable finger are reset to release the target object, then the robotic arm is reset, and this round of actions is ended. If not, the robotic arm is reset, an execution mode of the robotic arm is obtained again, and actions are performed according to the foregoing procedures. In this mode, the spearing and sorting of unburied or half-buried plastic waste objects, fiber waste, and the like can be completed.

It is to be noted that the robotic arm control system determines, according to vision information, whether it is completed to assist in determining whether bag breaking or sorting is completed, and this may be implemented based on a deep neural network. For the recognition of whether bag breaking is completed, vision images including various bagged waste objects and bags being broken and bags being not broken are constructed, and annotation is performed to generate a sample set, and the deep neural network is trained to obtain a classification model for determining whether bag breaking is completed, to recognize whether bag breaking is completed. Similarly, for the sorting mode and the spearing mode, corresponding samples may be respectively constructed to train the deep neural network, to respectively obtain a classification model for determining whether grabbing is completed and a classification model for determining whether spearing is completed, to recognize whether grabbing or spearing is completed.

It may be understood that for the same or similar parts in the foregoing embodiments, reference may be made to each other. For content that is not described in detail in some embodiments, refer to the same or similar content in other embodiments.

For the collaborative-manipulation robotic arm for kitchen waste and the working method thereof provided in the foregoing embodiments, the multi-mechanism collaborative manipulation of the robotic arm can be implemented to complete the bag breaking, sorting, and spearing work of kitchen waste, so that the advantages of automation, intelligence, safety, and reliability are provided. Compared with an existing sorting robotic arm, the following advantages are provided:

1. A multifunctional robotic arm including mechanisms such as the vision module, the haptic sensors, the front guide claw, the rear cutting claw, the retractable finger, and the like is innovatively designed in the present invention, different execution modes are selected according to different kitchen waste, the problem that a current robotic arm has unvaried sorting manners is solved, and sorting is more efficient.

2. A multifunctional robotic arm with integrated haptic-vision sensing is designed in the present invention, haptic information and vision information are integrated, and it is determined, according to the haptic information and the vision information, whether sorting or bag breaking is implemented, thereby improving the reliability of waste sorting and bag breaking.

3. The present invention has a multi-mechanism collaborative function, and for kitchen waste with varied classes and forms, the multi-mechanism collaborative manipulation completes the bag breaking, sorting, and spearing work of kitchen waste, so that the practicability is very strong.

Although the embodiments of the present invention have been shown and described above, it can be understood that, the foregoing embodiments are exemplary and should not be understood as limitation to the present invention. A person of ordinary skill in the art can make changes, modifications, replacements, or variations to the foregoing embodiments within the scope of the present invention.

What is claimed is:

1. A working method of a collaborative-manipulation robotic arm for a kitchen waste, wherein the collaborative-manipulation robotic arm comprises:
   a base, comprising a first mounting seat and a second mounting seat, wherein the first mounting seat is transverse, and the second mounting seat is connected to the first mounting seat and extends downward;
   a driving mechanism, disposed at an end of the first mounting seat away from the second mounting seat;
   a front guide claw, an upper end of the front guide claw being connected to the driving mechanism;
   a fixed blade, disposed on a side of the second mounting seat facing the front guide claw;
   a retractable finger, disposed at a lower end on the side of the second mounting seat facing the front guide claw;
   a vision module, disposed at a bottom of the first mounting seat; and
   at least two haptic sensors, respectively disposed on the fixed blade and the retractable finger;
   wherein the retractable finger comprises a movable blade, a second reduction motor, a transmission disk, and a connecting rod; and an output shaft of the second reduction motor is connected to a center of the transmission disk, a first end of the connecting rod is connected to an eccentric center of the transmission disk, a second end of the connecting rod is connected to a tail end of the movable blade, and the movable blade passes through a movable blade limiting hole provided in the second mounting seat;
   wherein the working method comprises:
   obtaining an execution mode of the collaborative-manipulation robotic arm; and
   performing, by the collaborative-manipulation robotic arm, actions according to the execution mode:
      when the execution mode is a bag breaking mode, performing the following actions: controlling the collaborative-manipulation robotic arm to move to a target position point, synchronously controlling the driving mechanism to drive the front guide claw to rotate to a designated position, and then controlling the front guide claw to push a bag containing a target object to the fixed blade to enable the fixed blade to pierce the bag containing the target object;
      when the execution mode is a sorting mode, performing the following actions: controlling the collaborative-manipulation robotic arm to move to the target position point, synchronously controlling the driving mechanism to drive the front guide claw to rotate to the designated position, and then controlling the front guide claw to rotate toward the fixed blade and close to grab the target object from the bag, wherein the target object comprises an elongated waste object; and
      when the execution mode is a spearing mode, performing the following actions: controlling the collaborative-manipulation robotic arm to move to the target position point, synchronously controlling the driving mechanism to drive the front guide claw to rotate to the designated position, then controlling the front guide claw to rotate toward the retractable finger and close to hold the target object, and subsequently controlling the retractable finger to extend to spear the target object; and
   after the collaborative-manipulation robotic arm finishes performing the actions according to the execution mode, using vision information acquired by a vision module disposed at a bottom of the first mounting seat and/or haptic information acquired by a haptic sensor disposed on the fixed blade/the retractable finger to assist in determining whether target actions are completed, and when the target actions are not completed, resetting the collaborative-manipulation robotic arm, obtaining the execution mode of the collaborative-manipulation robotic arm again, and performing the actions according to the execution mode.

2. The working method according to claim 1, wherein in the collaborative-manipulation robotic arm, the front guide claw comprises two symmetrically disposed curved claws; and
   each curved claw of the two symmetrically disposed curved claws comprises a roller rod curved toward the second mounting seat, a roller mounting seat disposed at a lower end of the roller rod, and a roller assembly mounted on the roller mounting seat.

3. The working method according to claim 2, wherein in the collaborative-manipulation robotic arm, the roller assembly comprises a first reduction motor mounted on the roller mounting seat, a roller shaft connected to an output shaft of the first reduction motor, and a roller mounted on the roller shaft.

4. The working method according to claim 2, wherein in the collaborative-manipulation robotic arm, the driving mechanism comprises a steering gear and a gear shaft transmission-connected to the steering gear; and upper ends of the two symmetrically disposed curved claws are respectively connected to two ends of the gear shaft.

5. The working method according to claim 1, wherein before the step of obtaining the execution mode of the collaborative-manipulation robotic arm, the working method further comprises:
- obtaining a depth vision image of the target object;
- inputting a Red, Green, Blue (RGB) image in the depth vision image into a deep neural network-based image recognition and classification model, to obtain a rectangular shape and position frame and a target object class of the target object;
- generating coordinate information of the target position point of the collaborative-manipulation robotic arm according to depth information in the depth vision image and the rectangular shape and position frame of the target object; and
- selecting the execution mode of the collaborative-manipulation robotic arm according to the target object class.

6. The working method according to claim 1, wherein the collaborative-manipulation robotic arm further comprises:
- at least two haptic sensors, respectively disposed on the fixed blade and the retractable finger.

* * * * *